(12) United States Patent
Arendt et al.

(10) Patent No.: US 8,022,127 B2
(45) Date of Patent: Sep. 20, 2011

(54) PLASTISOLS CONTAINING GLYCEROL ESTERS AS PLASTICIZERS

(75) Inventors: William D. Arendt, Libertyville, IL (US); Makarand Joshi, Grayslake, IL (US); Jason Butt, Berwyn, IL (US)

(73) Assignee: Eastman Specialties Holdings Corporation, Kingsport, TN (US)

(*) Notice: Subject to any disclaimer, the term of this patent is extended or adjusted under 35 U.S.C. 154(b) by 0 days.

(21) Appl. No.: 12/410,093

(22) Filed: Mar. 24, 2009

(65) Prior Publication Data

US 2010/0249300 A1 Sep. 30, 2010

(51) Int. Cl.
*C08K 5/10* (2006.01)
*C08K 5/11* (2006.01)

(52) U.S. Cl. ........ 524/310; 524/317; 524/311; 524/314; 524/312

(58) Field of Classification Search .............. 524/310, 524/311, 312, 314, 317
See application file for complete search history.

(56) References Cited

U.S. PATENT DOCUMENTS

| 5,444,110 | A | * | 8/1995 | Kitazawa et al. ............. 524/100 |
| 6,652,774 | B2 | * | 11/2003 | Zhou et al. ................ 252/182.24 |
| 6,740,254 | B2 | | 5/2004 | Zhou |
| 6,811,722 | B2 | | 11/2004 | Zhou et al. |
| 2006/0052497 | A1 | | 3/2006 | Hopfmann et al. |
| 2006/0183830 | A1 | | 8/2006 | Friedrich et al. |

FOREIGN PATENT DOCUMENTS

WO WO 2008/011536 A2 * 1/2008

OTHER PUBLICATIONS

Notification of Transmittal of the International Search Report and the Written Opinion of the International Searching Authority, or the Declaration date of mailing Mar. 4, 2010 received in corresponding International Application No. PCT/US10/26216.

* cited by examiner

*Primary Examiner* — Robert D. Harlan
(74) *Attorney, Agent, or Firm* — Brett L. Nelson; Brenard J. Graves, Jr.

(57) ABSTRACT

Plastisols and organosols are provided that include plasticizers that include mono-, di- and triesters of glycerol. The plasticizers are good solvators for polyvinyl chloride and impart low plastisol and organosol viscosities.

8 Claims, No Drawings

PLASTISOLS CONTAINING GLYCEROL ESTERS AS PLASTICIZERS

The present invention relates to plastisol compositions that include glycerol esters which are effective plasticizers for plastisols of organic polymers. In addition to compatibility with the organic polymers, the glycerol esters exhibited unexpectedly good solvation characteristics. The plastisols described herein had low plastisol viscosities, low fusion temperature and increased gel strength.

BACKGROUND

Known prior art plasticizers for polymers include but are not limited to esters that are reaction products of 1) aliphatic or aromatic mono- and dicarboxylic acids with 2) mono- and dihydric alcohols or glycols. Typical plasticizers for vinyl chloride polymers include esters of benzoic acid with monomeric or oligomeric glycols and esters of phthalic acid with monohydric alcohols.

U.S. Pat. Nos. 6,652,774; 6,740,254; and 6,811,722, describe mixed esters of glycerol as phthalate-free plasticizers for resinous polymers, including vinyl polymers, rubbers, polyurethanes and acrylics. At least one of the esters in the mixture exhibits the general formula $CH_2(OOR^1)CH(OOR^2)CH_2(OOR_3)$ wherein at least two of $R^1$, $R^2$ and $R^3$ are different alkyl groups. In preferred embodiments $R^1$, $R^2$ and $R^3$ contain up to 11 carbon atoms each, preferably from 2 to about 11 carbons each.

The ester compositions described in the aforementioned patents are mixtures prepared by reacting a mixture of at least two carboxylic acids with glycerol. The types and relative concentrations of the individual esters in the resultant mixtures vary from batch to batch. This variation makes it difficult to predict the composition of a particular batch or the level of plasticization that would be imparted to a polymer by that batch and, more importantly, the concentration of a particular batch of plasticizer required to achieve a desired degree of plasticization.

U.S. Pat. No. 5,444,110, describes crosslinkable plastisols wherein the polyvinyl chloride resin contains epoxy groups. The specification of this patent contains a listing of over 100 esters commonly used as plasticizers.

SUMMARY

Environmentally friendly plasticizers for plastisols are provided. The plasticizers impart a predictable degree of plasticization to a plastisol or organosol, making it possible to calculate and include the quantity of plasticizer required to achieve a desired level of plasticization in a plastisol or organosol based on rigid polymers such as vinyl chloride and copolymers thereof.

In one aspect, polymer composition are provided that include a thermoplastic polymer selected from the group consisting of homopolymers and copolymers of vinyl chloride, and homopolymers and copolymers of acrylic; and an amount of plasticizer effective for plasticizing the thermoplastic composition. The plasticizer includes a glycerol ester selected from the group consisting of mono-, di- and triesters of glycerol and mixtures thereof. Glycerol esters which can be utilized have a general formula

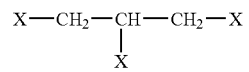

wherein 0 to 2 X groups are hydroxyl and 1 to 3 X groups are

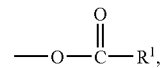

wherein $R^1$ is $—(CH_2)_n—CH_3$, where n is 0 to 5,
wherein all $R^1$ groups are identical,
and wherein if n is 0, then 1 to 2 X groups are hydroxyl.

Shaped articles are provided that are selected from the group consisting of films, coatings, molded articles, extruded articles, cast articles. The shaped articles are formed from polymer compositions described herein.

A method is provided for making a polymer composition. The method includes dispersing organic polymer and blending a glycerol ester of the general formula with the polymer in an amount effective for plasticizing the polymer.

DETAILED DESCRIPTION

The present plasticizers are compatible with a variety of polymers typically used in the formulation of plastisols. These polymers include but are not limited to vinyl chloride homopolymers and copolymers, and acrylic homopolymers and copolymers. Plastisols are blends of plasticizers with PVC. In addition plastisols will generally contain heat stabilizers and other ingredients such but not limited to fillers, pigments, solvents, UV stabilizers, antioxidants, dispersants, blowing agents such as but not limited to azodicarbonamide, kickers for the blowing agent(s) and other adjuvants to tailor the composition to the application. As used herein, plastisols include acrylic homopolymers and copolymers as these newer resins were designed to replace PVC in "plastisol or organosol" compositions. The acrylic compositions may also include at least some of the additional materials described herein.

Glycerol tributyrate has been found to be compatible to at least 40% of a plastisol composition based on homopolymer polyvinyl chloride. Compatibility of a given ester with a polymer can be determined by blending the desired amount of glycerol ester with a finely divided form of the polymer at a temperature of 25° C., fusing the plastisol composition and determining the compatibility of the plasticizer with a plastic sheet thus prepared.

The glycerol esters of this invention can be the only plasticizer in the plastisol or organosol. Alternatively, these esters can be used in combination with other plasticizers conventionally used with the selected polymer. In the case of vinyl chloride polymers these additional plasticizers include but are not limited to esters derived from a) the reaction of monofunctional alcohols with monofunctional acids aliphatic of aromatic monocarboxylic acids; b) the reaction of glycols or diols with monofunctional acids such as benzoic acid, or c) the reaction of an alkyl or aromatic dicarboxylic acid such as phthalic acid with a monofunctional or polyfunctional alcohol. Esters of benzoic acid together with mono- and diesters of the isomeric cyclohexanedicarboxylic acids, also referred to as hexahydrophthalic acids, are preferred classes of auxiliary plasticizers. Other plasticizers that can be used include but are not limited to compatible members of the following families: citrates, sulphonamides, alkyl sulfonic acid esters, adipates, saturated low molecular weight polyesters, isobutyrates and glutarates.

Many of the glycerol esters suitable as plasticizers in the present polymer compositions are commercially available. Those which are not can be prepared using known esterification reactions involving glycerol and a monocarboxylic acid containing from 3 to 6 carbon atoms. The molar ratio of acid to glycerol will be substantially equivalent to the average number of esterifies hydroxyl groups per molecule desired in the final ester. In the case of the tributyl ester, this product is commercially available as n-butyl ester, isobutyl ester or mixtures thereof.

Any objectionable odor of higher glycerol esters such as the tributyrate in a plastisol or organosol may be masked using small quantities of fragrances including but not limited to juniper oil. At higher hydroxyl content the odor of the ester is significantly reduced.

Plastisols and organosols containing the plasticizers of this invention can be prepared using conventional techniques for preparing these compositions. In accordance with one method, the glycerol ester or a mixture of these esters together with any desired additional plasticizers are blended with a finely divided form of the polymer to be modified.

The present plasticizers will wet and slowly solvate particles of a finely divided resinous polymer such as a vinyl chloride homo- or copolymer. Mixtures of finely divided polymer and plasticizer can be molded into shaped articles using slush molding or other conventional techniques, cast to form films or coatings on a variety of substrates, dip coated onto an existing shaped articles such as gloves or coated on to a substrate such as sheets of flooring material formed from a vinyl or other type of polymer. Gelation of the polymer typically occurs at temperatures below 150° C. The resin particles are then fused by heating the initial film or other shaped article to between about 150 and 210° C. for a sufficient time to develop maximum physical properties.

Plastisols prepared using the plasticizers described herein are characterized by excellent Theological properties at both low and high shear rates. This property is particularly advantageous, in for example, the preparation of vinyl flooring, during which a vinyl sheet is coated with the plastisol, following which the plastisol is then allowed to gel. The resultant coated sheet is then rolled up prior to final fusing of the polymer.

Plastisols and organosols containing one or more of the glycerol esters described herein in combination with polymers, such as the homopolymers and copolymers of vinyl chloride and other polymers described, are suitable for use alone or in combination with known plasticizers in a variety of additional end use applications. End use applications may include but are not limited to films, coatings, the fabrication of shaped articles by known techniques, including but not limited to slush, dip, rotational molding, and casting.

Organic liquids suitable for use in organosols include but are not limited to aliphatic, cycloaliphatic, aromatic, and mixed solvents at levels to assist in the control of rheology and therefore application properties.

Organosols are used in some applications where viscosity control can not be achieved by the selection of plasticizer or level of plasticizer required is not adequate. For example, highly filled plastisols sometimes require solvent use to achieve proper application rheology. The plasticizers of this invention can be used to advantage to control viscosity and rheology with less or no solvents thus eliminating or reducing volatility issues.

An environmentally important advantage of the present esters is that they can be prepared using glycerol and acids obtained from naturally occurring materials in contrast to the petroleum-based reactants used to prepare conventional plasticizers based on aromatic mono- and dicarboxylic acids.

The use of the glycerol esters of the present invention provides a decrease in viscosity of the plastisol composition of about 70% to about 80% after 1 hour and a decrease in viscosity of the plastisol composition of about 70% to about 80% after 1 day, as compared to plastisol compositions made with DOP (di-2-ethylhexyl phthalate) or DINP (diisononyl phthalate) as the plasticizer.

The following examples describe preferred polymer compositions and plasticizers of the present invention. The examples should not be interpreted as limiting the scope of the present invention as described in the accompanying claims. Unless otherwise specified all parts and percentages are by weight.

EXAMPLES

Plastisol compositions were prepared by blending 100 parts of a finely divided vinyl chloride homopolymer available as Geon 121A from Polyone, 3 parts of a calcium/zinc based heat stabilizer available as Mark 1221 from Chemtura with one of the following glycerol eaters: 1) 70 parts of glycerol tributyrate (low hydroxyl content), 2) 70 parts of glycerol trioctoate. As controls for the evaluation diisononyl phthalate (DINP) and di-2-ethylhexyl phthalate (DOP) were also evaluated. The resultant mixtures were blended as described in the following detailed procedure to form plastisols.

A homogeneous blend of 100 parts of the polymer and 70 parts of glycerol trioctoate could not be prepared due to the incompatibility of this amount of ester with the polymer. This composition therefore could not be evaluated using some of the test procedures used for the other two plastisol samples.

Plastisol Preparation
Equipment
  Vessel: A 19 ounce-capacity unlined steel can suspended in water bath
  Mixing Device: High torque overhead stirrer equipped with 2" high speed dispersion blade set approximately ½" above bottom of can
Preparation
  1. The plasticizer were placed in the can
  2. Started timer and began mixing @ 700 rpm
  3. Mixed for 1 minute
  4. Added polyvinyl chloride and heat stabilizer
  5. Increased speed to 1250 rpm
  6. Stopped mixing after 12 minutes
  7. Degassed sample for 20 minutes under vacuum and agitation
Plastisol Sheet Fusion
Equipment
  Two 10"×9"×⅛" clean glass sheets
  Four 1"×1"×0.048" glass shims
Preparation
  1. Placed one glass sheet on a flat and level bench top
  2. Placed a glass shim at each corner of this sheet
  3. Poured a pool of plastisol in the middle of the glass sheet
  4. Placed the second glass sheet on top of the first in a manner that did not trap any air in the plastisol pool
  5 Pressed down on each shim to insure uniform plastisol thickness
  6. Placed the mold assembly into a forced air oven for 10 minutes @ 190° C.

7. Removed mold assembly and separated the fused sheet from the glass and allow to cool Test Methods Viscosity:
  Measured using TA model AR-2000 rheometer under the following conditions
    Method type: Flow
    Geometry: 2 cm steel plate on peltier plate with 500 micron gap
    Temperature: 25° C.
    Test Method: Pre-shear 66.30 Pa for 10 sec
      Equilibrate (no shear) for 30 sec
      Shear ramp 2-900 1/s over 90 sec
    Report: Viscosity at 100 and 500 sec$^{-1}$
  Brookfield viscosity: Measured using ASTM D1824 -95 at 20 RPM.

Gel/Fusion:
  Measured using TA model AR-2000 rheometer under the following conditions
    Method type: Oscillation
    Geometry: 2 cm steel plate with 500 micron gap
    Temperature: 40 to 210C at a rate of 5° C./minute
    Test Method: Initial stress of 0.2 Pa for 10 sec
    Frequency: 1 Hertz
    Displacement: 0.0001 radians
    Report: Temperature at G'=500 Pa (gel temperature value); G' peak temperature and stress; G' X G" cross is indication of final fusion.

Tensile Properties: ASTM D 638-03, Type IV specimen, Speed of tester was 20 in/min Durometer Hardness Measured using ASTM test method 2240-97, Shore A Loop Spew: 1"×3" samples were cut from the fused sheets. An "X" was made with a ball point pen in the center of the sample. The sample was bent to form a loop with the "X" on the inside surface of the loop. The loop was clipped with a binder clip with the inside center of the loop at a distance of ¼" from the grip of the clip.

The loop was maintained for the specified time periods at a temperature of 23° C. At the end of the test interval the loop was removed from the clip and the loop folded in the opposite direction. The inner surface of the loop, which had maximum stress, and therefore maximum likelihood of exudation, was examined for exudation of plasticizer. Samples were rated according to the following scale:

0—no exudation,
  1—Slight exudation; "X" smears or trace of exudate;
  2—Moderate—small spots of exudate,
  3—Heavy—area totally wetted.

Roll spew: 1"×3" samples were cut from the fused sheets, covered with 1"×3" pieces of yellow paper, rolled and secured roll with a rubber band. The samples were then placed in a 60° C. forced air oven for 1 day, following which they were removed and allowed to cool. Each sample was then unrolled and any exudation of liquid evaluated according to the following scale: 0—no stain on paper, 1—slight stain on paper, 2—definite stain, oil layer on film, 3—severe stain, oily film Carbon Volatility: Evaluated using ASTM test procedure D1203-94 Method A

TEST RESULTS

TABLE 1

Plastisol Viscosity and Rheology

| Test | DOP | DINP | Tributyrate | Trioctanoate |
|---|---|---|---|---|
| Brookfield RVT, mPa·s | | | | |
| 1 hr. | 1850 | 1780 | 430 | 480 |
| 1 day | 2400 | 2150 | 640 | 508 |
| AR 2000, Initial, Poise | | | | |
| 100 sec −1 | 3.09 | 3.8 | 0.52 | 1.73 |
| 500 sec −1 | 5.65 | 8.27 | 0.91 | 3.88 |

TABLE 2

Plastisol Gel/Fusion Data

| Test | DOP | DINP | Tributyrin | Trioctanoate |
|---|---|---|---|---|
| G' Inflection, @ 500 Pa | 76 | 83 | 62 | 125 |
| G' Pa | 278,900 | 263,800 | 409,000 | 60,000 |
| Temperature, ° C. | 123 | 132 | 106 | 152 |
| G' X G" upper intersection, temperature, ° C. | 187.5 | 189 | 190 | 196 |

TABLE 3

Physical Performance Data

| Tests | DOP | DINP | Tributyrate | Trioctanoate* |
|---|---|---|---|---|
| Compatibility | Compatible | Compatible | Compatible | Incompatible |
| Loop rating, 4 weeks | 0 | 0 | 0 | NA |
| Roll rating, sum of 3 days | 0 | 0 | 0 | NA |
| Tensile Data | | | | |
| Tensile at Break, psi | 2323 | 2310 | 2136 | NA |
| 100% Modulus, psi | 779 | 857 | 624 | NA |
| Elongation, % | 475 | 440 | 500 | NA |
| Shore A, 10 sec. | 57 | 58 | 54 | NA |
| Activated Charcoal volatility, % lost, 24 hours, 70° C. | 1.5 | 1.4 | 8.3 | NA |

*= Glycerol trioctoate at a concentration of 70 phr was incompatible with the polymer and was not tested further.

The data above demonstrates that glycerol tributyrate is compatible, a good solvator (as indicated by G' peak temperature, G' level and G' inflection) for PVC (much better than DOP or DINP) and, surprisingly, plastisols based on the glycerol tributyrate have low viscosities and good rheology as indicated in the comparison to plastisols based on diisononyl phthalate (DINP) or di-2-ethylhexyl phthalate. Glycerol tributyrate is an efficient plasticizer but is volatile compared to the general purpose plasticizers. While it is relatively volatile, it can be a very useful plasticizer for viscosity control of plastisols and other applications.

What is claimed is:

1. A polymer composition comprising:
   a) a thermoplastic polymer selected from the group consisting of homopolymers and copolymers of vinyl chloride, and homopolymers and copolymers of acrylic; and
   b) an amount of plasticizer effective for plasticizing the thermoplastic polymer, the plasticizer including least one ester selected from the group consisting of mono-, di- and triesters of glycerol corresponding to the general formula

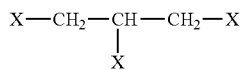

wherein 0 to 2 X groups are hydroxyl and 1 to 3 X groups are

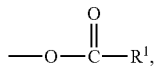

wherein $R^1$ is $-(CH_2)_n-CH_3$, where n is 0 to 5, wherein all $R^1$ groups are identical, and wherein if n is 0, then 1 to 2 X groups are hydroxyl.

2. The polymer composition according to claim 1 wherein $R^1$ includes from 3 to 6 carbon atoms.

3. The polymer composition according to claim 1 wherein the polymer composition includes from about 1 to about 70 parts by weight glycerol ester per 100 parts thermoplastic polymer.

4. The polymer composition according to claim 1 wherein the composition has a ratio of glycerol to carboxylic acid of about 1 to 2.5 to about 1 to 3.0.

5. The polymer composition according to claim 1 wherein the plasticizer is glycerol tributyrate.

6. The polymer composition according to claim 1 wherein said composition contains at least one additional plasticizer selected from the group consisting of a) the reaction products of monofunctional alcohols with monofuctional acids aliphatic of aromatic monocarboxylic acids; b) the reaction of glycols or diols with monofunctional acids such as benzoic acid, and c) the reaction of at least one carboxylic acid selected from the group consisting of alkyl and aromatic dicarboxylic acids with at least one alcohol selected from the group consisting of monofunctional and polyfunctional alcohols and monomeric and oligomeric glycols.

7. The polymer composition of claim 1 wherein said composition contains at least one additional plasticizer selected from the group consisting of phthalates, terephthalates, citrates, sulphonamides, alkyl sulfonic acid esters, adipates, saturated low molecular weight polyesters, isobutyrates, and glutarates.

8. The polymer composition of claim 1 wherein the glycerol ester is a blend of from 1 to 70 parts by weight per 100 parts of said thermoplastic polymer of a first ester and from about 30 to about 100 parts by weight per 100 parts of said thermoplastic polymer of a second ester.

* * * * *